(12) United States Patent
Collins

(10) Patent No.: US 6,554,547 B1
(45) Date of Patent: Apr. 29, 2003

(54) TIRE RASP BLADE AND METHOD OF USE

(75) Inventor: Anthony Collins, Belmont (AU)

(73) Assignee: B & J Manufacturing Company, Inc., Glenwood, IL (US)

( * ) Notice: Subject to any disclaimer, the term of this patent is extended or adjusted under 35 U.S.C. 154(b) by 0 days.

(21) Appl. No.: 09/635,387

(22) Filed: Aug. 9, 2000

(51) Int. Cl.$^7$ .............................. B23D 71/04; B26D 1/14
(52) U.S. Cl. ................. 407/29.1; 407/29.13; 407/29.15
(58) Field of Search ................... 407/29.1, 29.11, 407/29.12, 29.13, 29.14, 29.15

(56) References Cited

U.S. PATENT DOCUMENTS

| | | | | |
|---|---|---|---|---|
| 806,962 A | * | 12/1905 | Ellis | 407/29.14 |
| 901,290 A | * | 10/1908 | Gardner | 407/29.14 |
| 2,085,202 A | * | 6/1937 | Sauer | 407/29.13 |
| 2,265,643 A | * | 12/1941 | Heath | 407/29.12 X |
| 2,416,203 A | * | 2/1947 | Neilsen | 407/29.12 |
| 2,896,309 A | | 7/1959 | Jensen | |
| 3,082,506 A | * | 3/1963 | Jensen | 407/29.12 |
| 3,102,325 A | | 9/1963 | Hemmeter | |
| 3,389,447 A | * | 6/1968 | Theobald et al. | 407/29.1 |
| 3,528,153 A | * | 9/1970 | Walter | 407/29.12 |
| 3,618,187 A | | 11/1971 | Jensen | |
| 3,680,185 A | * | 8/1972 | Wood | 407/29.12 |
| 3,747,177 A | | 7/1973 | Jensen | |
| 3,879,825 A | | 4/1975 | Jensen | |
| 4,019,234 A | | 4/1977 | Jensen | |
| 4,021,899 A | | 5/1977 | Jensen | |
| 4,059,875 A | | 11/1977 | Jensen | |
| 4,091,516 A | | 5/1978 | Jensen | |
| 4,265,007 A | * | 5/1981 | Delattre et al. | 407/29.12 |
| 5,067,216 A | * | 11/1991 | Hargraves | 407/29.14 |
| 5,283,935 A | | 2/1994 | Jensen | |
| 5,461,762 A | | 10/1995 | Jensen | |
| 5,647,698 A | | 7/1997 | Jensen | |

\* cited by examiner

*Primary Examiner*—Henry W. H. Tsai
(74) *Attorney, Agent, or Firm*—Emrich & Dithmar

(57) ABSTRACT

In an arrangement of rasp blades on a tire buffing machine, adjacent rasp blades in a stack of blades are mounted to the rasp hub. The blades are placed in alternating relations such that the teeth on one blade are staggered relative to the teeth on adjacent blades to increase blade life and to improve the texture of buffed tire casings and, thus, the quality of the bond between the casing and the new tread.

4 Claims, 2 Drawing Sheets

TIRE RASP BLADE AND METHOD OF USE

RELATED APPLICATION

This application claims the benefit of filing date of Australian Patent Application No. 58291/99, filed Nov. 4, 1999, now Patent No. 719,185.

FIELD OF THE INVENTION

The present invention is in the field of tire retreading apparatus, and relates to improvements in both the apparatus and method used for retreading tires. In particular, the invention relates to rasp blades, and an improved assembly and method of use of such blades on tire rasp hubs for buffing away the tread on worn tires.

BACKGROUND OF THE INVENTION

The conventional process by which tire casings are retreaded is to buff away the worn tread, repair any damage that may be required in the casing after buffing, bond a new tread to the casing by a selected vulcanizing process, and then cure the rubber so as to harden and shape it into the desired tread design.

In order to buff and remove the worn tread, the casing is mounted on a buffing machine and inflated. A tire buffing rasp hub, comprising a hub core having a large number of toothed rasp blades mounted thereon, is then rapidly rotated, for example, on a motor driven shaft, and the peripheral surface of the casing bearing the worn tread is forced against the rotating rasp hub to loosen, tear and grind off the excess rubber and roughen the remaining surface sufficiently so that the buffed surface of the casing can form a sufficient bond with the new replacement rubber tread in the vulcanizing process. Each tire size has a predetermined crown width, profile and radius and the casing must be buffed to the particular shape, size and texture to receive a new tread that ensures proper tread-to-road contact. Buffing of the worn tread is, therefore, a critically important stage of the retreading process affecting the quality, performance and safety of retreaded tires.

Rasp blades of the prior art comprise numerous configurations and shapes, a preferred type having teeth of essentially dove-tail shape projecting from the outer working edge. Individual teeth have a notch cut out from the center of the periphery or working edge of the tooth to form a series of substantially "Y" shaped teeth defined by cutouts of partly circular shape. The notch formed in each tooth divides it into halves. Each half of a given tooth is offset to opposite sides of the general plane in which the blade lies, thus creating a primary cutting edge followed by a laterally spaced buffing edge for each tooth. As the rasp hub is rotated, the primary cutting edge and the buffing edge prepare the surface of the casing to a texture necessary to bond new rubber to it.

A typical tire buffing rasp hub which includes such rasp blades as aforementioned has the form of a hub core defined by interconnected front and back cylindrical end plates having mounted therebetween arcuate or quadrant-shaped rasp blades stacked in four (or more) separate arrays around the perimeter of the core. Each rasp blade of any one stack is separated from adjacent blades of the stack by spacers, the stack being secured in position between the end plates by support pins. Removable fasteners hold the end plates together, sandwiching the rasp blades, thus allowing for dismantling of the rasp hub for purposes of replacement, such as when the teeth become worn or are broken. The stacks of blades may be inclined relative to a plane perpendicular to the axis of rotation of the hub; and the stacks may be alternated in this inclination or offset. That is, the blades of one stack may be inclined toward one end of the core and an adjacent stack inclined toward the opposite end of the core.

Prior to the present invention, all blades of whatever configuration and shape used on tire rasp hubs were of identical shape, size and distribution of teeth for that particular tire rasp hub. For instance, any two adjacent blades in a stack had identical secondary and tertiary configuration and the teeth of one blade were substantially laterally aligned with the teeth of the adjacent blade. This was usually facilitated by using identical blades throughout and fixing each blade of a stack in a "name down" direction, whereby the manufacturer's name appeared on only one of the two opposed faces of the blade and indicated the direction in which the name side of all blades of that stack were to face. Where this technique was not employed, some other means of facilitating the stacking of the blades in a commonly aligned direction was used. Furthermore, all of the teeth on each blade were symmetrically disposed along the working edge of the blade. For instance, the tooth closest to one end was located the same distance from that end as the tooth closest to the other end was located from that other end. Thus, the blades and configuration of teeth remained the same even if the blade were reversed and the "name" sides of adjacent blades faced each other.

SUMMARY OF THE INVENTION

I have found that by off-setting or indexing all of the teeth in alternate blades in a stack, a superior and longer lasting buffing performance and improved buffed texture are achieved, and the useful life of the blades is prolonged. The offset or staggered relation of adjacent teeth in a stack may be achieved by providing blades with a one-quarter pitch displacement that separates each tooth in the blade. The lateral offsetting may then conveniently and reliable be achieved by stacking the blades in an alternating "name up," "name down" direction. The assembly of blades so formed presents one form of a staggered teeth array across each stack of the rasp hub.

The present invention thus provides a rasp blade having indexed teeth that can be used in the assembly of tire rasp hub having a staggered teeth array between adjacent blades in each stack of the rasp hub.

By using a tire rasp assembled with staggered teeth according to the invention, worn tire tread may be buffed away from a casing at a rapid rate while developing minimum amount of heat that might otherwise adversely affect the texture of the buffed surface needed for suitable retreading.

According to the present invention there is provided an arrangement of rasp blades on a tire rasp hub, wherein at least one stack of laterally spaced apart rasp blades is fitted to the rasp hub as an array extending circumferentially around the tire rasp hub (or slightly skewed), wherein adjacent rasp blades in a stack include a first blade having a first set of teeth uniformly distributed along a working edge of the fist blade at a predetermined pitch, and a second blade having a second set of teeth uniformly distributed along a working edge of the second blade. The second set of teeth has the same pitch as the teeth of the first blade; but they are located in a staggered relationship to the teeth of the first set.

By "staggered," it is meant that by proceeding along a line perpendicular to the stacked blades and crossing a tooth in one blade, one will then cross the "cut out" or space between adjacent teeth on the next blade, followed by crossing a tooth, then a cut out, and so on, in this repeated pattern.

Preferable, the first blade has a first tooth of its set of teeth at a first predetermined distance relative to a reference end of its blade body, and the second blade has a first tooth of its set of teeth at a second predetermined distance relative to the end of its blade body closest to the reference end, the said first and second predetermined distances being offset by one-half of the pitch of the teeth to produce the a staggered relationship when the teeth are assembled in a stack.

In a preferred form, the first and second blades are of identical shape and configuration. Each of the said blades has a first tooth of its set of teeth at a first predetermined "lead in" distance relative to a reference end of the blade and a second tooth of its set of teeth at a third predetermined or "lag" distance relative to the end of the blade furthest from the reference end. By offsetting the lead in distance from the reference end by a quarter of the pitch so that the lag distance is three-quarters of the pitch, and then assembling the first and second blades adjacent one another and in oppositely facing directions (name up/name down) in the stack, adjacent teeth on adjacent blades are offset by one-half pitch.

Other feature and advantages of the present invention will be apparent to persons skilled in the art from the following description accompanied by the drawing wherein the same reference numerals will refer to like elements in the various views.

DETAILED DESCRIPTION OF THE PREFERRED EMBODIMENT

Figure 1:
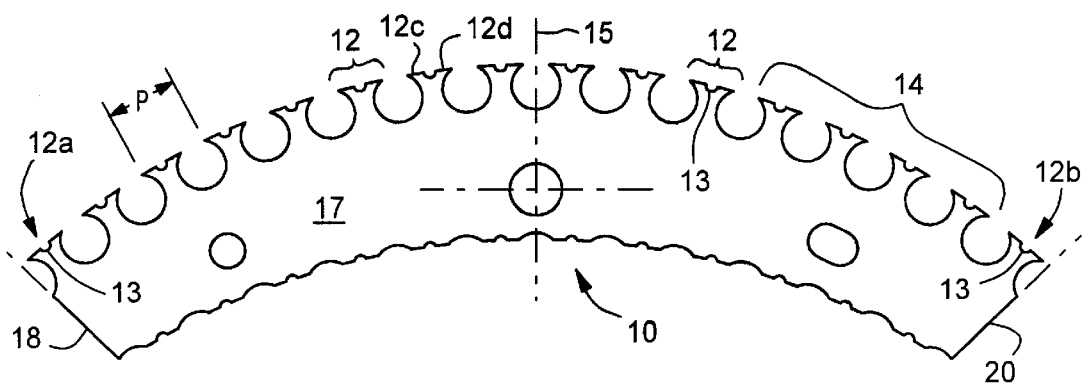
FIG. 1 is a side elevational view of a prior art rasp blade having teeth of the so-called "dove tail" shape.
Figure 2:
FIG. 2 is a plan view of the prior art rasp blade of FIG. 1.

The rasp blade 10 of the prior art shown in FIGS. 1 and 2 is formed in a quadrant or arcuate shape. That is, it extends around approximately one quarter of a cylindrical hub. The blades may be perpendicular to the axis of rotation of the hub or they may be slightly skewed (by 3°–5°, for example) relative to the perpendicular, as is known. Morever, alternate stacks may be skewed in opposing directions (i.e., one toward one end of the rasp hub, the next toward the other hub end. The manner of manufacturing and form of the rasp blade 10 having a set of teeth 12 of essentially dove-tail shape is well known, as exemplified in U.S. Pat. No. 3,082,506.

The set of teeth 12 are uniformly distributed along a working edge 14 of the prior art blade 10 and have a predetermined pitch. As used herein, the pitch is the distance from the leading edge of one tooth to the leading edge of the next adjacent as illustrated at P in FIG. 1. A first tooth 12a is closest to a first ("reference") end 18 of the blade 17. A second tooth 12b is closest to the other end 20 of the blade 17 which is furthest from the reference end 18. The centers of the teeth 12a, 12b (i.e., the middle of the notch 13 separating the two individual teeth sections 12c, 12d formed by the notch) are located the same distance away from each respective end 18, 20 so that the set of teeth 12 are symmetrically disposed relative to the center 15 and the ends 18, 20 of the blade body 17.

The teeth 12 are twisted so that one individual section 12c formed by the notch 13 is displaced to one side of the blade body 17 and the other tooth section 12d is displaced to the other side of the blade body 17 (see FIG. 2), thus providing the two individual tooth sections 12c, 12d, and two leading cutting edges for each dove-tail tooth 12.

Figure 4:
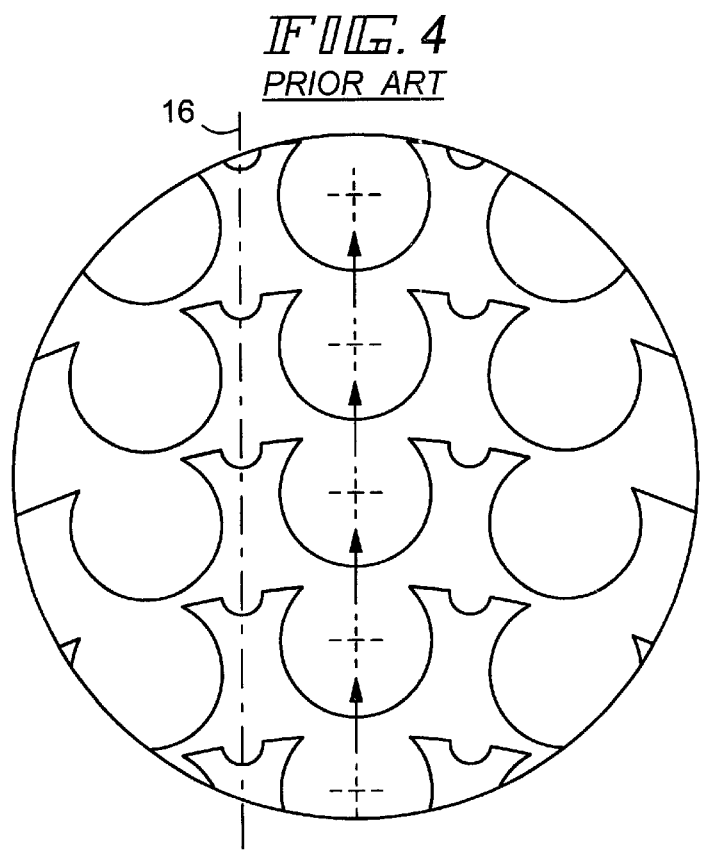
FIG. 4 is a schematic view of a portion of a stack of rasp blades mounted to a rasp hub according to the prior art.

In a rasp hub upon which a plurality of the rasp blades 10 are mounted in stacks of four separate parallel arrays (one stack in each quadrant) with alternate stacks slightly inclined in opposing directions relative a plane perpendicular to the axis of rotation of the hub, each of the spaced apart blades of the stack have their respective sets of teeth 12 lined up substantially horizontally or vertically in use, as is also well know in the prior art, and as shown in FIG. 4. That is, proceeding along a line, such as in designated 16 in FIG. 4, which is perpendicular to the plane of the blades, the teeth are laterally aligned.

Figure 3:
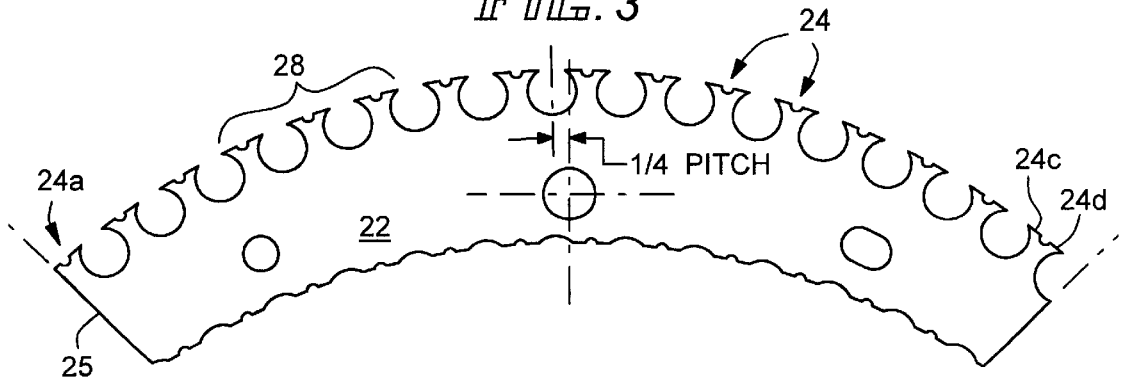
FIG. 3 is a side elevational view of a rasp blade, having teeth of dove tail shape, and wherein the teeth are offset or indexed from one end of the blade by a quarter of the pitch of the teeth.

The improved rasp blade 22, as shown FIG. 3, has identically shaped and configured teeth 24, and differs from the prior art rasp blade 10 in that all of the teeth 24 are indexed or offset toward the first or reference end 25 of the body 28 by one-quarter of the pitch by which each tooth is repeated, as seen in FIG. 3. It will, of course, be readily appreciated by persons skilled in the art that the extent of indexing or offsetting of the teeth in the blades used in the arrangement of the present invention may vary, provided that when the blades are assembled in side-by-side relation (spaced by suitable spacers) on a tire rasp hub, the teeth of one blade are staggered relative to the teeth in the next adjacent blades. When offset by a quarter of the pitch relative to the prior art blade in, say, a counterclockwise direction shown in FIG. 3 across the blade 22, the tooth section 24a closest to the first end 25 will comprise less than a complete tooth section; and the tooth 24b furthest from the first end 25 will comprise one complete tooth structure. (i.e., having both forward and rear sections 24c, 24d)

Figure 5:
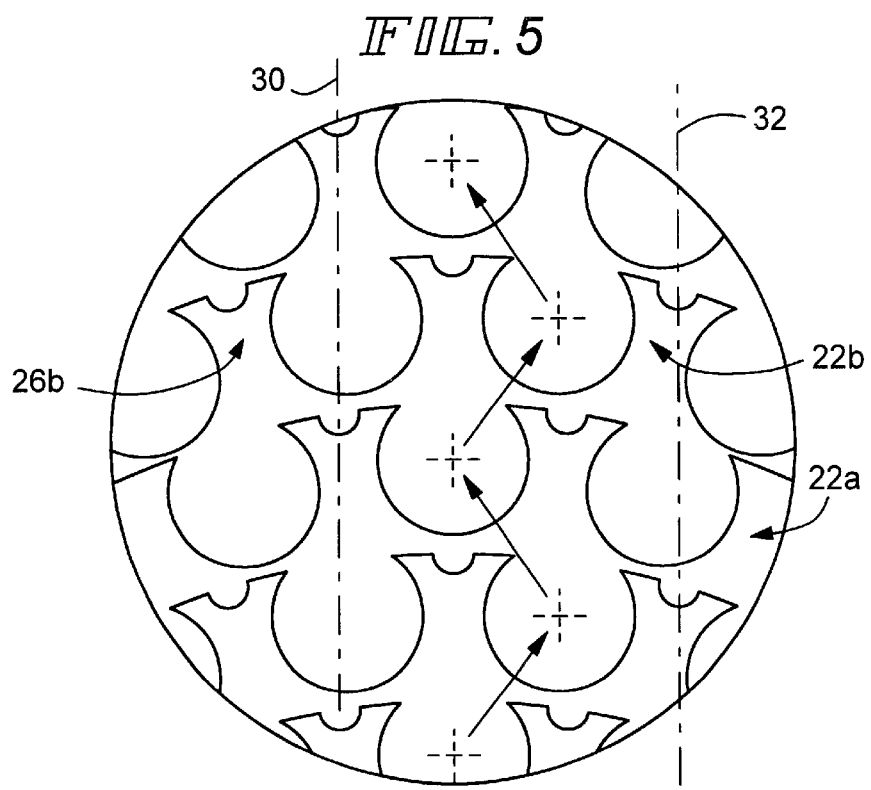
FIG. 5 is a schematic view of a portion of a stack of the rasp blades of FIG. 3 mounted to a rasp hub according to a preferred staggered arrangement according to the present invention.

Referring to FIG. 5 the rasp blades 22 are arranged in a stack on a rasp hub in back-to-back relation—i.e. with the sides of each adjacent blade facing in alternating directions whereby, in any two adjacent rasp blades (22a, 22b), a first blade 22a is placed in a first direction (e.g., "name up") and an adjacent blade 22b is placed is an oppositely facing direction ("name down"). In this way, the set of teeth of the first blade 22a will be aligned as indicated by the line 32, but offset by one-half of the pitch of the teeth from the teeth 26b of the second set of blade 22b to produce a staggered relationship of the two sets of teeth (24a, 24b).

The desired staggered relationship of the respective sets of teeth of any two adjacent rasp blades in a stack of a rasp hub, may also be produced by utilizing the rasp blades of the prior art, namely, those having their teeth symmetrically disposed across the working edge of the blade (such as in FIG. 1), by locating these blades in an is unaligned stack of blades where alternate blades of the stack are shifted sideways in its position relative to its immediately adjacent blades (on either side thereof) by a distance of, say, half the pitch of the teeth, so as to provide an arrangement similar to that shown in FIG. 5.

A rasp hub fitted with a series of stacked rasp blades 22 arranged whereby the teeth are staggered in the manner shown in FIG. 5 provides superior buffing performance over rasp hubs fitted with prior art rasp blades in the conventional manner. Not only is the texture of the buffed surface improved, but the overall number of tires which can be buffed to an acceptable standard is increased with the arrangement of the present invention. The industry has accepted as a standard, the R.M.A. scale from 1 to 6 of texture of smooth (value of 1) to rough (value of 6) textures. A value of 3 or 4 is acceptable (3 is preferable). Significantly more tires can be buffed to the desired texture having the R.M.A. value of 3 or 4 with the present invention than with the prior art arrangement of blades with laterally aligned teeth.

Persons skilled in the art will appreciate that certain modifications may be made to the illustrated embodiment and equivalent structure substituted for that disclosed while continuing to practice the principle the invention; and it is, therefore, intended that all such modifications and substitutions be covered as they are embraced within the spirit and scope of the appended claims.

I claim:

1. A rasp blade adapted for used in a stack of rasp blades, comprising an arcuate body defining a plurality of teeth each separated from adjacent teeth by a space, said teeth located at a constant pitch along a working edge of said body, said body defining a reference end and an opposite end spaced from said reference end, said plurality of teeth including a first tooth most adjacent said reference end and spaced therefrom by a first predetermined distance equal to a fraction of said pitch, and a second tooth most adjacent said opposite end and spaced therefrom by a second predetermined distance, said first and second predetermined distances differing by approximately one-half of said pitch.

2. In an arrangement of rasp blades on a tire rasp hub for use in buffing tire casings, said arrangement comprising at least one stack of spaced-apart rasp blades arranged in a parallel array, each of said blades comprising an arcuate body having a plurality of teeth spaced along a working edge of said blade at a pitch, said blade having a reference end and an opposite end spaced from said reference end, and a mounting aperture centered on said blade, said plurality of teeth being offset approximately one-quarter of said pitch from a center of said mounting aperture whereby said blades may be stacked on a hub in alternately facing directions and said reference end of each blade aligns with said opposite end of adjacent blades and the teeth of adjacent blades are in staggered relation.

3. A rasp blade for use on a tire rasp hub, comprising:

a flat arcuate body having an annular shape with first and second opposing sides and first and second opposing ends, said ends extending generally radially of a cylindrical hub on which said blade is adapted to mount;

a plurality of teeth formed in pre-determined pitch on an arcuate working edge of said body, each tooth having a central notch to form first and second adjacent tooth sections, adjacent tooth sections having offset to opposing lateral sides of said blade, each tooth section having a forward cutting edge;

said plurality of teeth including a first tooth located at approximately one-quarter of said pitch from said first end of said blade, and a second tooth located at approximately three-quarters of said pitch from said second end of said blade, and characterized in that a plurality of said blades may be arranged side-by-side in a stack on a hub in alternately facing directions and with the respective ends of adjacent blades aligned, and the teeth of adjacent blades are staggered when viewed along an axial direction of said hub.

4. In a method of retreading a tire casing, the steps of arranging a plurality of arcuate rasp blades on a core of a tire buffing machine by placing said blades in alternately facing directions in a stack of parallel blades having first and second ends such that the alternate ends of adjacent blades are aligned, said blades being substantially the same, each blade having a set of teeth spaced at a pitch, a first tooth most adjacent said first end of each blade being spaced therefrom by a first distance, a second tooth most adjacent said second end being spaced therefrom by a second distance, said first and second distances differing by one-half said pitch.

\* \* \* \* \*